United States Patent
Hayakawa

(10) Patent No.: US 7,460,118 B2
(45) Date of Patent: Dec. 2, 2008

(54) IMAGE PROCESSOR, IMAGE PROCESSING METHOD AND IMAGE PROCESSING PROGRAM

(75) Inventor: Ryutaro Hayakawa, Tokyo (JP)

(73) Assignee: Sega Corporation (JP)

( * ) Notice: Subject to any disclaimer, the term of this patent is extended or adjusted under 35 U.S.C. 154(b) by 196 days.

(21) Appl. No.: 11/212,838

(22) Filed: Aug. 29, 2005

(65) Prior Publication Data

US 2006/0055711 A1 Mar. 16, 2006

(30) Foreign Application Priority Data

Aug. 31, 2004 (JP) ............................. 2004-253521

(51) Int. Cl.
*G06T 15/00* (2006.01)

(52) U.S. Cl. ...................... 345/419; 345/428; 345/473; 345/629

(58) Field of Classification Search ....................... None
See application file for complete search history.

(56) References Cited

U.S. PATENT DOCUMENTS 6,121,977 A * 9/2000 Arai et al. .................... 345/619
6,791,549 B2 * 9/2004 Hubrecht et al. ............. 345/473
6,828,973 B2 * 12/2004 Fery ........................... 345/473
7,184,051 B1 * 2/2007 Matsumoto et al. .......... 345/581

FOREIGN PATENT DOCUMENTS

JP 2004-54612 2/2004

* cited by examiner

*Primary Examiner*—Mark Zimmerman
*Assistant Examiner*—Andrew Yang
(74) *Attorney, Agent, or Firm*—Dickstein Shapiro LLP

(57) ABSTRACT

An image processing method and an image processor for drawing the movements of such linear objects as fur, hair, and grass of a turf being influenced by wind have not been proposed thus far. The present invention provides image processing method executed by an image processor for projecting and drawing linear objects viewed from view point on a two-dimensional plane when the view point, ground, and linear objects, of which one end of each linear object is fixed on the ground, are positioned in virtual three-dimensional space, comprising a drawing step of layering the cross-sections of linear objects created by cutting the plurality of linear objects at planes which are parallel with the ground for each of planes as semi-transparent layers, and a redrawing step of moving the semi-transparent layers in a predetermined direction after a predetermined time elapsed and redrawing the semi-transparent layer(s) on the two-dimensional plane.

17 Claims, 18 Drawing Sheets

FIG.6

| ZONE | DISTANCE FROM VIEWPOINT | SHELL COUNT | MAXIMUM MOVING AMOUNT |
|---|---|---|---|
| 71 | 21~30 | 6 | 0 |
| 72 | 31~40 | 5 | 2 |
| ... | ... | ... | ... |
| 76 | 71~80 | 1 | 10 |

FIG.8

| ZONE | MAXIMUM BRIGHTNESS |
|---|---|
| 71 | 10 |
| 72 | 15 |
| ... | ... |
| 76 | 35 |

FIG.10

RULE TABLE (RELATIONSHIP BETWEEN LIGHTING AND DEGREE OF INFLUENCE GIVEN BY THE FLUCTUATION OF SHELLS)

| ZONE | LIGHTING | | FLUCTUATION |
|---|---|---|---|
| | MICRO | MACRO | |
| ZONE 71 | 100% | 0% | 100% |
| ZONE 72 | 100% | 0% | 90% |
| ZONE 73 | 80% | 20% | 60% |
| ZONE 74 | 50% | 50% | 40% |
| ZONE 75 | 20% | 80% | 10% |
| ZONE 76 | 0% | 100% | 0% |

NEAR ←——————→ FAR

FIG.14 EXAMPLE OF FLUCTUATION OF LINEAR OBJECTS (e.g. GRASS OF A TURF) CAUSED BY FLUCTUATION OF SHELLS

FIG.15

| SHELL | MAXIMUM MOVING AMOUNT |
|---|---|
| SHL1 | 10 |
| SHL2 | 8 |
| ... | ... |
| SHL6 | 0 |

IMAGE PROCESSOR, IMAGE PROCESSING METHOD AND IMAGE PROCESSING PROGRAM

CROSS-REFERENCE TO RELATED APPLICATIONS

This application is based upon and claims the benefit of priority from the prior Japanese Patent Application No. 2004-253521, filed on Aug. 31, 2004, the entire contents of which are incorporated herein by reference.

BACKGROUND OF THE INVENTION

1. Field of the Invention

The present invention relates to an image processor, image processing method and image processing program for drawing on a two-dimensional plane such linear objects as hair, the grass of a turf, and fur, disposed on a virtual three-dimensional space.

2. Description of the Related Art

Currently computer graphics (hereafter CG) for performing image processing by a computer is widely being used for CAD (Computer Aided Design) and CAM (Computer Aided Manufacturing) in science, engineering, manufacturing, gaming and other fields. There are many objects drawn by CG technology, but a certain difficulty has been recognized for writing linear objects such as the fur of mammals, human hair, and rice, wheat and the turf of a landscape.

This is because the shapes of skin and ground, on which linear objects are positioned, are complicated, and how a linear object extends itself (its length and how it extends upward) has no regularity. So in prior arts, methods for drawing such linear objects have been proposed.

According to "Rendering Fur with Three Dimensional Textures" by Kajiya and two others, SIGGRAPH '89, Conference Proceedings, a hair is regarded as a micro-cylinder, and the sum of the diffused light and the reflected light on this micro-cylinder is added as a parameter for rendering (converting information on an object or graphic provided as numeric data to images by calculation), so as to represent the texture of the fur of an animal. This micro-cylinder is an example of an object having anisotropic reflection characteristics, and is introduced as a "texel" in "Rendering Fur with Three Dimensional Textures" by Kajiya and two others, SIGGRAPH '89, Conference Proceedings.

While the reflections of light are the same in all direction in "Rendering Fur with Three Dimensional Textures" by Kajiya and two others, SIGGRAPH '89, Conference Proceedings, according to "Mounting by vertex shader of pseudo fur lighting" by Imakiire, XFC 2001 [Searched on Aug. 25, 2002] Internet <URL: http://if.dynsitc.net/t-pot/program/23_fur/index.html> the representation of fur by Goldman, where the reflection components and the transmission components are separated, is advanced one more step and a fur representation, unique to the author of "Mounting by vertex shader of pseudo fur lighting" is introduced to shading. According to "Real-time Fur Over Arbitrary Surfaces" by Jerome Lengyel and three others, ACM Symposium on Interactive 3D Graphics 2001, pp. 227-332 [Searched on Aug. 25, 2002] Internet <URL: http://research.microsoft.com/~hoppe/fur.pdf>, a hair, which vertically extends from skin, is cut by a plurality of semi-transparent layers perpendicular to the height direction, and semi-transparent layers are drawn a plurality of times from the one closer to the skin and are layered so as to draw a hair at high-speed. In "Real-time Fur Over Arbitrary Surfaces", this semi-transparent layer is introduced as a "shell".

According to Japanese Patent Application Laid-Open NO. 2004-54612, instead of slicing fur in the height direction and regarding each slice as a map corresponding to a different shell, as stated in "Real-time Fur Over Arbitrary Surfaces" an image processor, which projects an entire hair on a two-dimensional map which corresponds to the skin surface, so as to enable high image quality representation with small memory capacity, is proposed.

SUMMARY OF THE INVENTION

Representation in prior art, however, is based on that such a linear object as hair remains still, and is not used for representing the movement of a linear object, such as the swinging ears of rice, wind blowing through a wheat field, or the grass of a turf moving by wind. In "Real-time Fur Over Arbitrary Surfaces" the possibility of moving hair is referred to, but this is stated merely as a future problem to be solved, and no specific method is suggested.

With the foregoing in view, it is an object of the present invention to provide an image processing method, an image processing program and an image processor for drawing the movement of linear objects, such as the fur of mammals, human hair, and the ears of rice, wheat and the turf of a landscape, caused by such a factor as wind, at high-speed and at low cost.

To achieve the above objects, the first aspect of the present invention provides a program causing a computer, which executes image processing for projecting and drawing a plurality of linear objects viewed from a view point on a two-dimensional plane when the view point, a ground, and the plurality of linear objects, of which one end of each linear object is fixed on the ground, are positioned in a virtual three-dimensional space, to execute the steps comprising a drawing step of layering cross-sections of the plurality of objects created by cutting the plurality of linear objects at a plurality of planes which are parallel with the ground for each of the plurality of planes, as semi-transparent layers and drawing them in a two-dimensional plane, and a redrawing step of moving a part or all of the semi-transparent layers in a predetermined direction after a predetermined time elapsed, and redrawing the semi-transparent layer(s) on the two-dimensional plane.

According to a preferred embodiment in the above aspect of the present invention, the program further comprises a step of calculating, for each linear object, a first brightness based on a static light source fixed in the three-dimensional virtual space and a second brightness which is different from the first brightness and which changes over time, a step of determining the degree of the influence of the first brightness and the second brightness, and a step of obtaining the brightness of the plurality of linear objects respectively based on the first brightness and the second brightness and the degree of the influence which is determined for the first brightness and the second brightness respectively.

According to a preferred embodiment in the above aspect of the present invention, the moving amount is less as a semi-transparent layer becomes closer to the ground. Also according to a preferred embodiment in the above aspect of the present invention, the redrawing step is executed repeatedly, the semi-transparent layer, which is moved in the rewriting step, is moved for a predetermined moving amount in the opposite direction of a predetermined direction after being moved for the predetermined amount in the predetermined direction, so as to implement a reciprocation of movement.

According to a preferred embodiment in the above aspect of the present invention, the number of semi-transparent layers to be drawn is decreased as the distance from the view point increases, and in the redrawing step, the semi-transparent layers are not moved in an area which exceeds the distance where the number of the semi-transparent layers is lower than a first threshold in the three-dimensional virtual space. Also according to a preferred embodiment in the above aspect of the present invention, in the drawing step, the number of semi-transparent layers to be drawn is decreased as the distance from the view point increases, and the degree of the influence of the second brightness is greater than the degree of the influence of the first brightness in an area which exceeds the distance where the number of the semi-transparent layers is lower than a second threshold in the three-dimensional virtual space. Also according to a preferred embodiment in the above aspect of the present invention, the position of the semi-transparent layer to be moved is determined by a first periodic function of which a variable is time.

To achieve the above objects, the second aspect of the present invention provides an image processor for projecting and drawing a plurality of linear objects viewed from a view point on a two-dimensional plane when the view point, a ground, and the plurality of linear objects, of which one end of each linear object is fixed on the ground, are positioned in a virtual three-dimensional space, comprising a storage unit for storing a control program and data on the view point, the ground and the linear objects respectively, and a control unit for implementing a drawing function for layering the cross-sections of the plurality of linear objects by cutting the plurality of linear objects at a plurality of planes which are parallel with the ground for each of the plurality of planes as semi-transparent layers, and drawing the cross-sections on a two-dimensional plane, and a redrawing function for moving a part or all of the semi-transparent layers in a predetermined direction after a predetermined time elapsed and redrawing the semi-transparent layer(s) on the two-dimensional plane by reading the control program and the respective data from the storage unit.

To achieve the above objects, the third aspect of the present invention provides an image processing method executed by an image processor for projecting and drawing a plurality of linear objects viewed from a view point on a two-dimensional plane when the view point, a ground, and the plurality of linear objects, of which one end of each linear object is fixed on the ground, are positioned in a virtual three-dimensional space, comprising a drawing step of layering the cross-sections of the plurality of linear objects created by cutting the plurality of linear objects at a plurality of planes which are parallel with the ground for each of the plurality of planes as semi-transparent layers, and drawing the cross-sections on the two-dimensional plane, and a redrawing step of moving a part or all of the semi-transparent layers in a predetermined direction after a predetermined time elapsed, and redrawing a semi-transparent layer(s) on a two-dimensional plane.

The fourth aspect of the present invention provides a recording medium recording the above mentioned program which can be read by a computer.

According to the present invention, when linear objects positioned in a three-dimensional virtual space are represented, semi-transparent layers (shells) with different heights are layered so that a turf, for example, can be drawn at high-speed, and the movement of the grass of the turf, such as bending or fluctuating in the wind, is represented by fluctuating the shells along with an elapse of time. By this, the movement of linear objects can be represented with a low calculation volume.

When the number of shells to draw linear objects is decreased according to the distance from the view point positioned in a three-dimensional space so as to implement LOD (Level Of Detail), shells to be fluctuated to represent the movement of linear objects may not exist in an area distant from the view point or the number of shells there may be too few to exhibit a visual effect, but these problems can be solved by using a value determined by a periodic function of which a variable is time, in addition to the brightness (micro-brightness) from the light source fixed in the three-dimensional virtual space when lighting processing is performed. By calculating brightness in this way, a turf distant from the view point can be brighter or darker at a predetermined period. Using this periodic change of brightness, the movement of linear objects can be represented even in an area where the number of shells is few, and the fluctuating movement of the linear objects along the direction of wind can be represented even if the linear objects are not dynamically fluctuating.

BRIEF DESCRIPTION OF THE DRAWINGS

FIG. 6 is a table showing an example of zones determined by the shell count decision unit;

FIG. 8 is a table showing an example of maximum brightness which the maximum brightness decision unit provides to each zone;

FIG. 10 is a rule table showing an example of representing the degree of the influence of micro-brightness and macro-brightness by rates;

FIG. 15 is a table showing an example of the maximum moving amount which is set for each shell;

DESCRIPTION OF THE PREFERRED EMBODIMENTS

Embodiments of the present invention will now be described with reference to the drawings. The technical scope of the present invention however is not limited to the embodiments, but includes the invention stated in the Claims and equivalents thereof.

Figure 1:
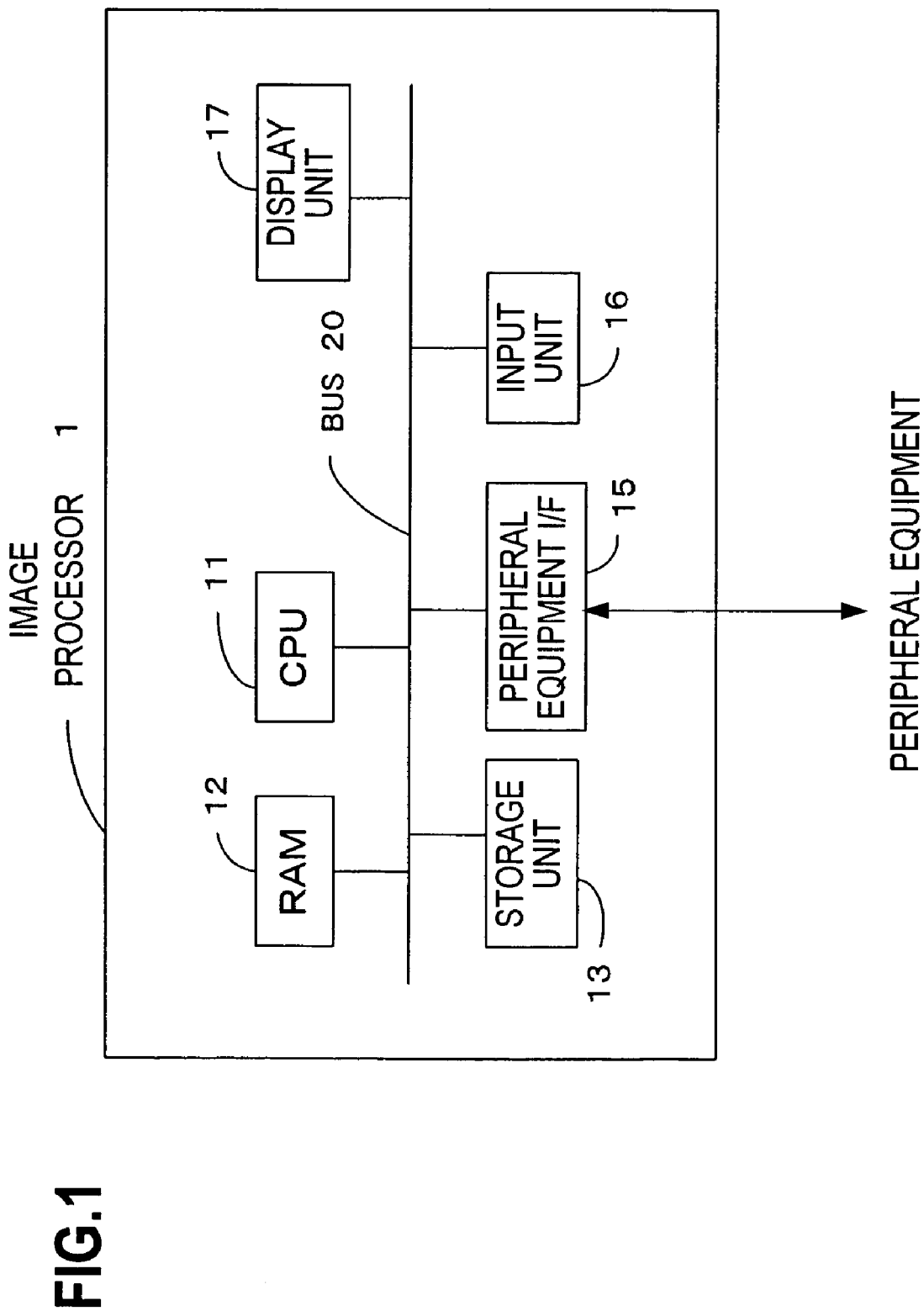
FIG. 1 is a block diagram depicting a configuration of the image processor according to an embodiment of the present invention.

FIG. 1 is a block diagram depicting the configuration of the image processor 1 according to an embodiment of the present invention. The image processor 1 of the present embodiment draws such linear objects as the fur of mammals, human hair, and rice, wheat and the grass of a turf in a landscape. When a turf, for example, positioned in a three-dimensional virtual space is represented in a drawing, the turf is drawn at high-speed by layering the semi-transparent layers (shells) with different heights, and also the movement of the grass of the turf, such as grass blades bent by wind or which fluctuate is expressed by fluctuating the shells over time elapses. By this, the movement of the grass of a turf can be expressed with a low calculation volume.

When the number of shells to draw the lawn is decreased according to the distance from the view point positioned in the three-dimensional space in order to implement LOD (Level Of Detail), the shell to be fluctuated to represent movement of the turf may not exist in an area distant from the view point, or the number of shells may be too few to exhibit a visual effect thereof, but the image processor 1 of the present embodiment solves this problem. For this, the image processor 1 of the present embodiment uses a value determined by a periodic function of which a variable is time, in addition to the brightness from the light source (micro-brightness) fixed in the three-dimensional virtual space when lighting processing is performed, so that the turf in an area distant from the view point becomes brighter or darker at a predetermined period. By this periodic change of brightness, the movement of linear objects can be represented even in an area where the number of shells are few.

By this, the movement of a turf fluctuating by wind can be collectively represented. Here the brightness for representing this collective movement is called the "macro-brightness". By using macro-brightness in addition to micro-brightness, the movement of a lawn fluctuating according to the direction of the wind can be represented without dynamically fluctuating the turf.

The image processor in FIG. 1 comprises a control unit 11, RAM (Random Access Memory) 12, storage unit 13, interface (I/F) for connecting peripheral equipment 15, input unit 16 and display unit 17 which are inter-connected by the bus 20. The control unit 11, which includes the CPU (Central Processing Unit), executes programs stored in RAM, and controls each unit included in the image processor 1.

RAM 12 is a storage means for temporarily storing the computing results of the processing of the image processor 1 and programs. The storage unit 13 is a non-volatile storage means, such as a hard disk, optical disk, magnetic disk and flash memory, where various data, and such programs as the OS (Operating System) before being read by RAM, are stored.

The peripheral equipment I/F 15 is an interface for connecting the peripheral equipment to the image processor 1, and has a USB (Universal Serial Bus) port or PCI card slot, for example. Peripheral equipment is, for example, a printer, SCSI (Small Computer System Interface) equipment, memory card reader/writer, network card, wireless LAN card and modem card. The connection format of peripheral equipment via the peripheral equipment I/F 15 may be either radio or cable.

The input unit 16 is an input device for inputting the input signals of an instruction (command) from the user to the image processor 1, and is a keyboard, mouse, touch panel or button, for example. The display unit 17 is a display device for displaying information on the user, such as a liquid crystal display or a CRT (Cathode Ray Tube). The image processor in FIG. 1 has the input unit 16 and the display unit 17, but an input device and display device externally connected to the image processor 1 via the peripheral equipment I/F 15, such as a USB mouse and projector and display for presentation, may be used. A network interface for connecting to a network may also be equipped in the main unit of the image processor 1.

Figure 2:
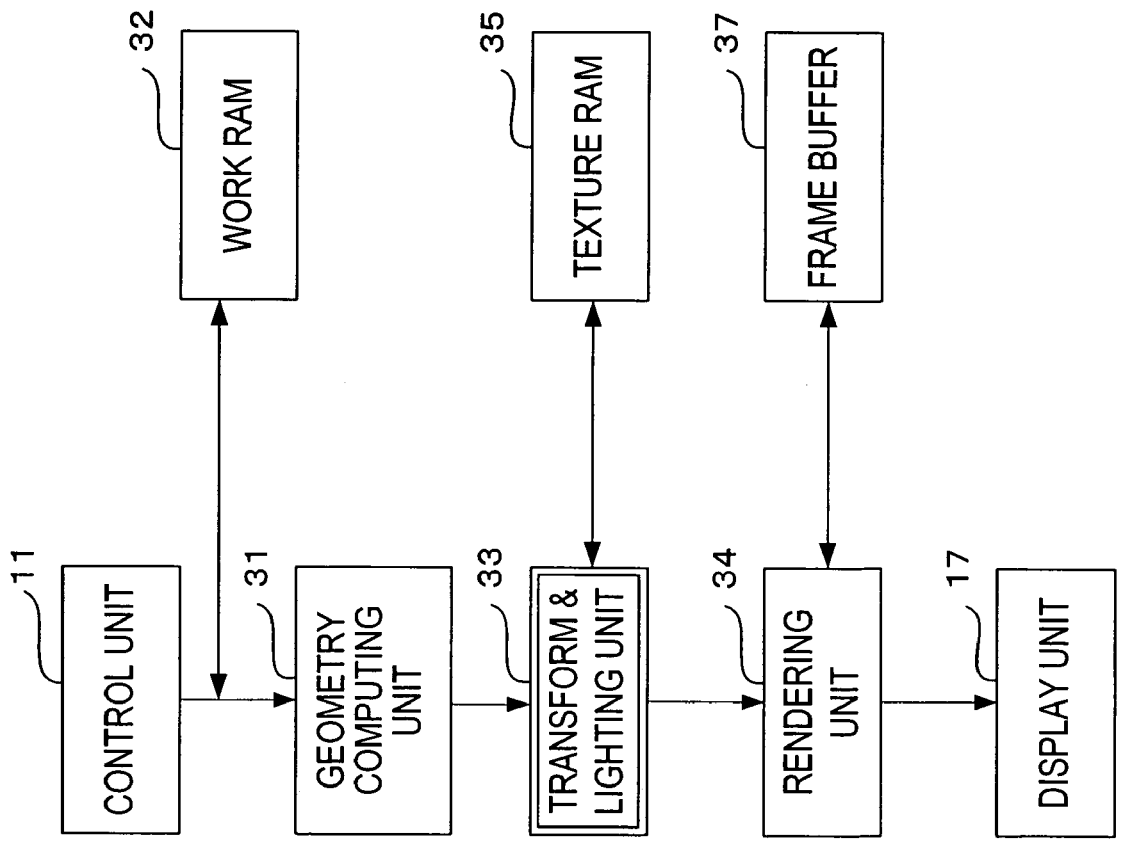
FIG. 2 is a block diagram depicting a function of the image processor according to an embodiment of the present invention.

FIG. 2 is a block diagram depicting the functions of the image processor 1 according to the present embodiment. In FIG. 2, the image processor 1 comprises the CPU 11, work RAM 32, geometry computing unit 31, transform & lighting unit (hereafter T&L unit 33), rendering unit 34, texture RAM 35, display unit 17 and frame buffer 37. Each function block is implemented by a program, and the program is executed by the CPU (Central Processing Unit) 11 installed in the image processor 1, but may be constructed by hardware, such as DSP (Digital Signal Processor).

The CPU 11 controls the programs for generating images. The programs and data to be used for the CPU 11 are stored in the work RAM 32. In the geometry computing unit 31, polygon data, which is three-dimensional object data in the world coordinate system, is read from the work RAM 32 and is input under the control of the CPU 11. The geometry computing unit 31 calculates the coordinates of the vertex included in the three-dimensional object data in the world coordinate system, and outputs it to the T&L unit 33.

The polygon data processed by the geometry computing unit 31 is input to the T&L unit 33, the T&L unit 33 performs lighting processing for calculating the influence by the light source (brightness) for each polygon, and transforms the coordinates so that the data in the viewing coordinate system of which origin is the view point is acquired. Also as the processing for texture to be pasted onto the surface of a three-dimensional object, the T&L unit 33 reads the texture from the texture RAM 35, and transforms the texture which was read according to the shape of the three-dimensional object.

The data processed by the T&L unit 33 is input to the rendering unit 34, and the data in polygons units is converted into data in pixel units in the rendering unit 34. The rendering unit 34 performs clipping, hidden plane removal and hidden line removal for erasing solid portions outside the field of view, and generates texture color for the data in pixel units based on the texture data and the brightness after texture transformation. And the rendering unit 34 transforms the texture color of each pixel into two-dimensional coordinates on the display unit 17, and writes it to the frame buffer 37. The data written in the frame buffer 37 is repeatedly read, converted into video signals, and is output to the display unit 17.

The work RAM 32, texture RAM 35 and frame buffer 37, shown in FIG. 2, can be implemented by the RAM 12 in FIG.

1. Now the characteristic portions of the image processor 1 of the present embodiment will be described.

Figure 3:
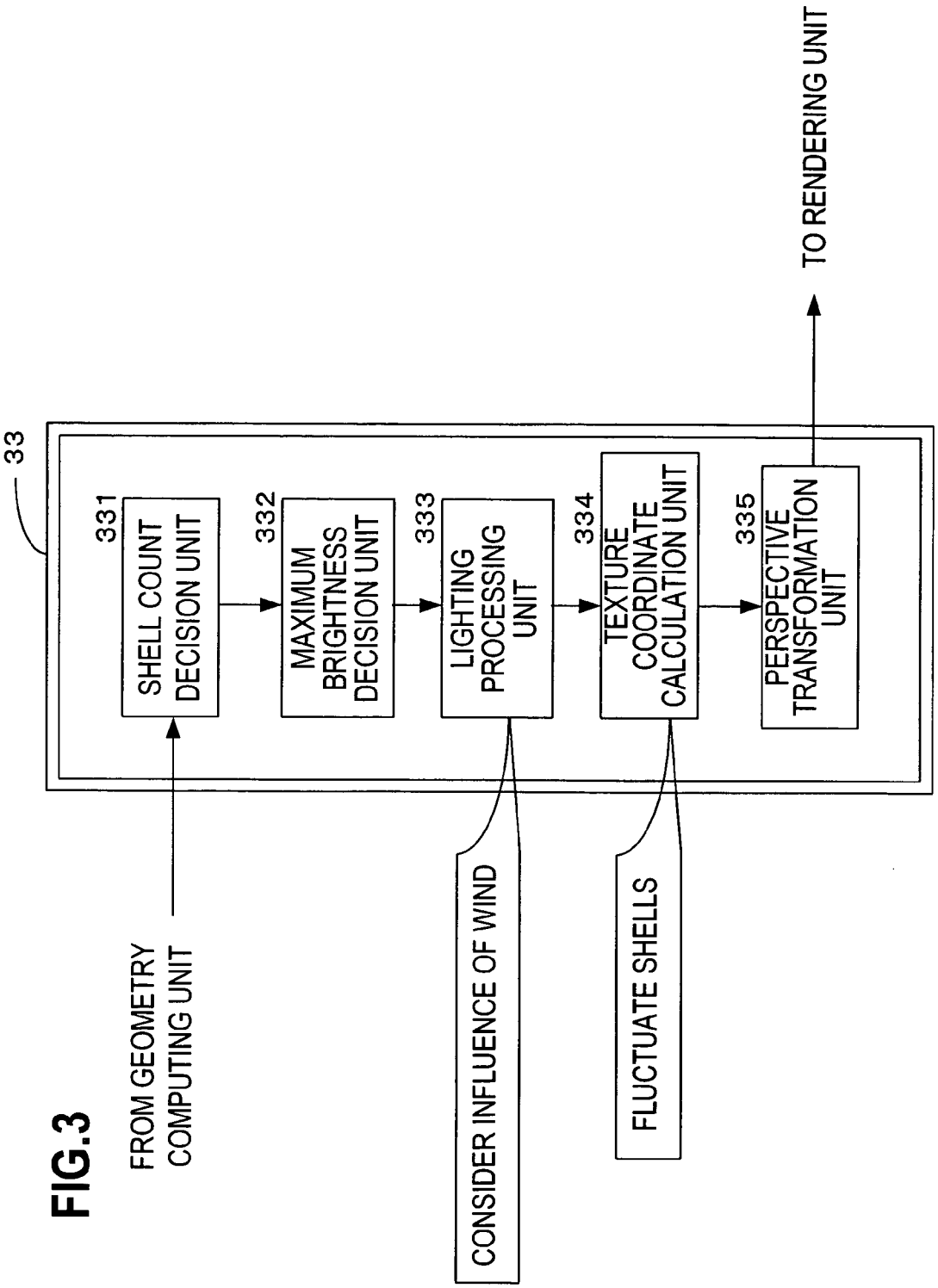
FIG. 3 is a diagram depicting in detail the T&L unit of the image processor according to the present embodiment.

FIG. 3 is a diagram depicting the T&L unit 33 in detail for describing the characteristic portion of the image processor 1 of the present embodiment. In the following description, it is assumed that the number of shells to draw the turf is decreased according to the distance from the view point so that the image processor 1 of the present embodiment implements LOD. To simplify the description of the present embodiment, a turf of a golf course is used as an example of the drawing target, and this example will be described first prior to the description of FIG. 3.

Figure 4:
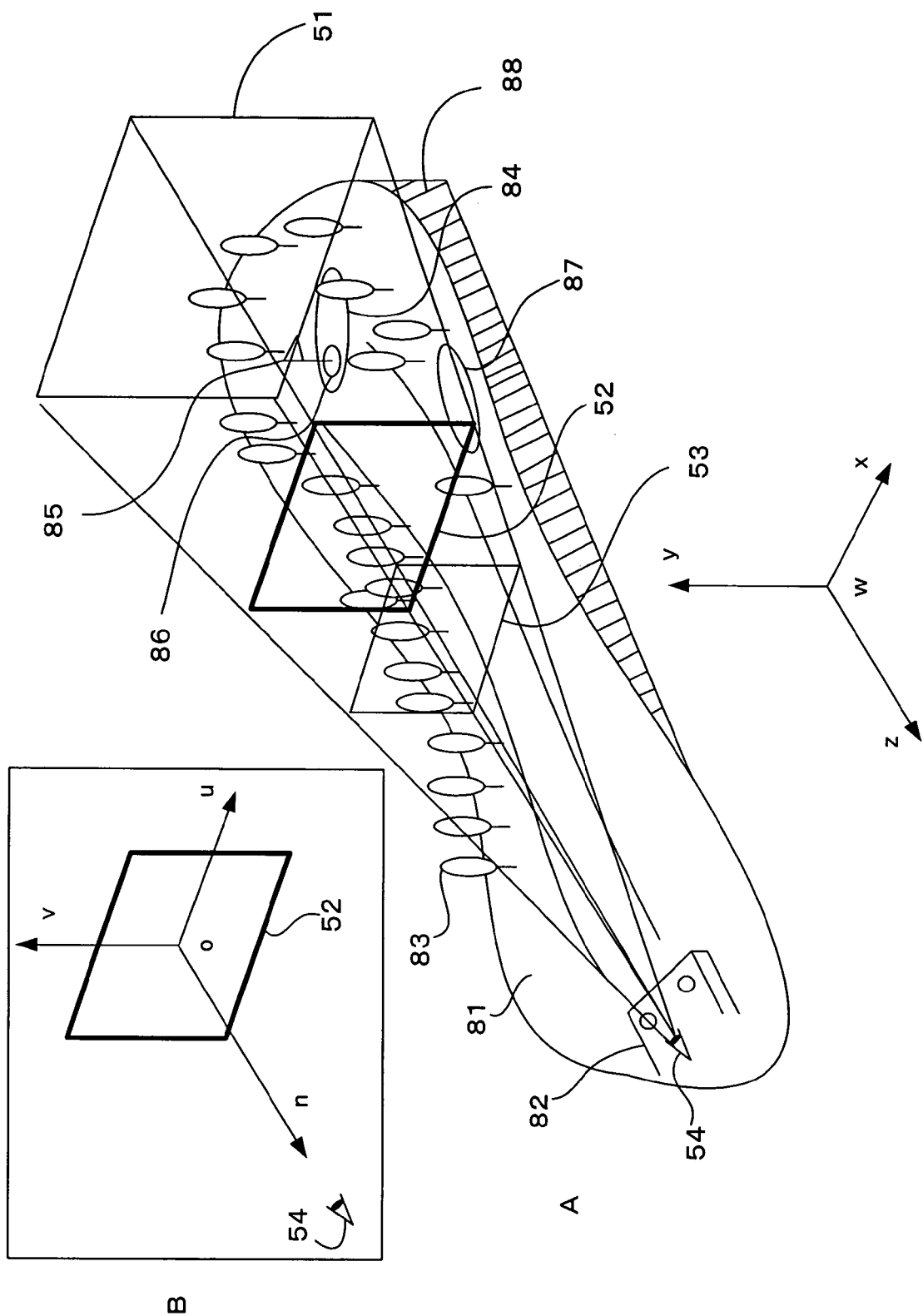
FIG. 4 is a diagram depicting the specific placement of a golf course in a three-dimensional virtual space used for the present embodiment, where A is a golf course which is placed in the world coordinate system (w-xyz coordinate system) in a three-dimensional virtual space, and B is the view reference coordinate system defined in the plane of projection.

FIG. 4 is a diagram depicting the status where the golf course used for the present embodiment is positioned in three-dimensional virtual space. It is assumed that the image processor 1 of the present embodiment draws a turf during a golf game, and in FIG. 4A, the golf course positioned in the world coordinate system (w-xyz coordinate system) in three-dimensional virtual space is drawn.

In the golf course 81, a teeing ground 82, trees 83, green 84, flag 85, hole 86, bunker 87 and ground 88 are disposed, and the turf, which is not illustrated in FIG. 4, extends from the ground with one end fixed to the ground. The view point 54 moves according to the position of the ball hit by a game player. On screen which the player views, the projection plane 52 of the two-dimensional plane in which the scene of the world coordinate system, viewed from the view point 54, is displayed.

The front chipping plane 53 and the back clipping plane 51 are used for performing parallel-translation and scaling, such as zoom up/down, and for normalizing when the rendering unit 34 performs clipping. This is for increasing the speed of clipping processing and enabling mounting by hardware, but a detailed description is omitted in the present embodiment.

In order to project the golf course 81 positioned in the three-dimensional virtual space onto the projection plane 52, each coordinate value of three-dimensional graphics in the world coordinate system must be transformed to the coordinate values of the view reference coordinate system (o-uvn coordinate system), which is a coordinate system for defining the projection plane 52. This transformation is called the "viewing transformation".

FIG. 4B is a diagram depicting the view reference coordinate system defined on the projection plane. The u axis and the v axis are defined to be parallel with the projection plane 52, and the n axis is defined to be perpendicular to the projection plane 52. Generally the origin of o-uvn coordinates need not be the center of the projection plane 52, but here in FIG. 4B the origin o is on the center of the projection plane 52. The view point 54 need not be on the n axis either, but here in FIG. 4B it is assumed that the view point 54 is on the n axis.

Figure 5:
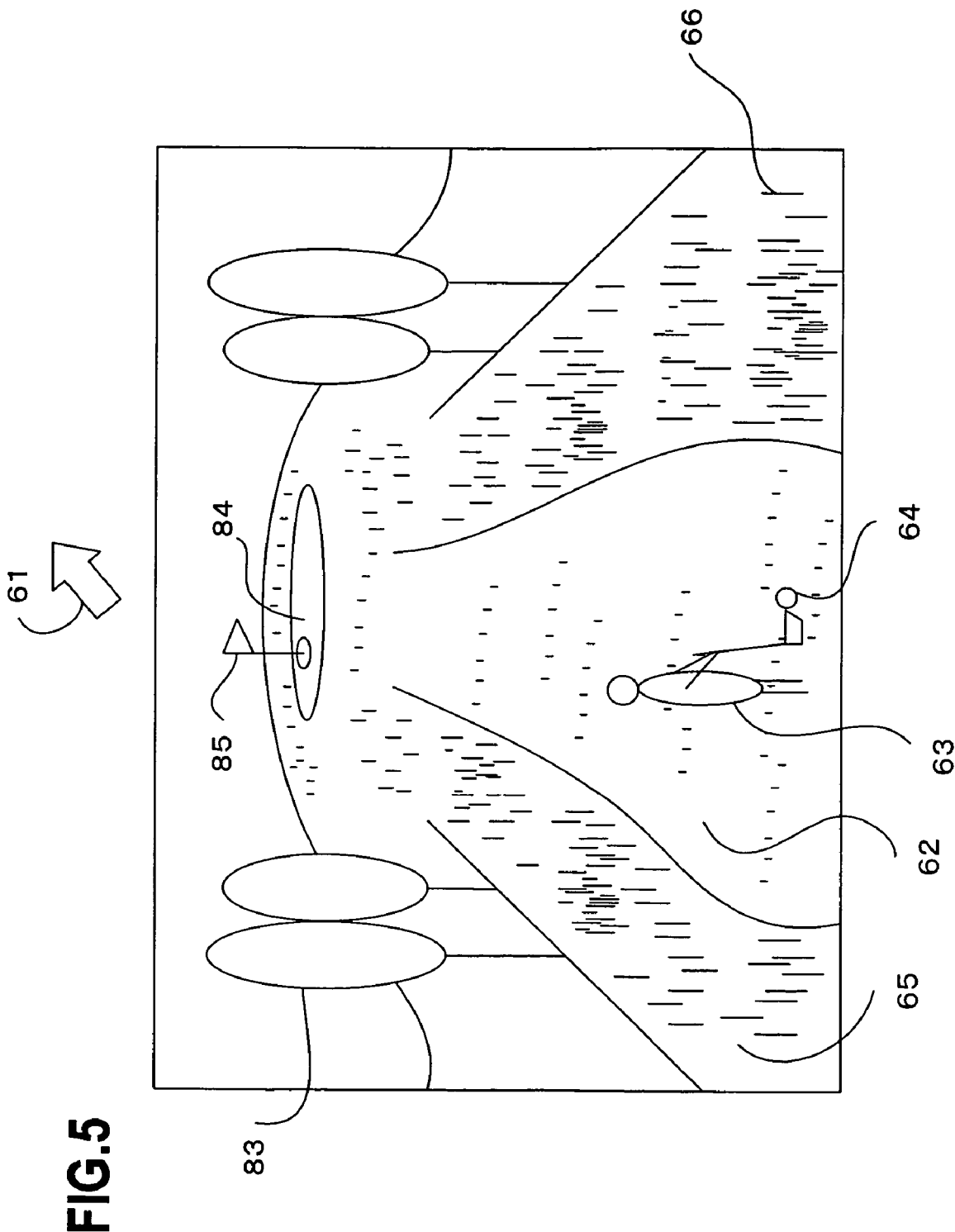
FIG. 5 is an example of a screen in an actual game.

FIG. 5 is a screen example of an actual game. In this scene, after the player takes hits a few times, the golf ball 64 moves on the fairway 62, and the character 63 holding a club, which is operated by the user, is about to swing for the next shot. As the golf ball 64 moves, the view point becomes closer to the green 84, and the green 84 becomes larger than that viewed from the teeing ground.

The rough 65, of which turf 66 is longer than the turf of the fairway 62, spreads around the fairway 62. As FIG. 5 shows, turf closer to the characters is drawn from long grass to short grass since this is close to the view point, and the turf with only short grass is drawn as the area becomes closer to the green 84.

The arrow 61 indicates the direction of the wind, and in this case the wind is blowing diagonally from the left front to the right back. FIG. 5 is a still picture where the turf 66 fluctuating by wind cannot be represented, but the image processor 1 of the present embodiment represents a series of turf 66 movement, such as bending in the wind or fluctuating, by periodically changing the brightness of the turf which is distant from the view point.

Returning to FIG. 3, the T&L unit 33 will be described. When the coordinates of the vertex included in the three-dimensional object data in the world coordinate system are input from the geometry unit 31, the shell count decision unit 331 of the T&L unit 33 decides the number of shells considering LOD. The shell count decision unit 331 decides a plurality of zones according to the distance from the view point, for example, and sets the number of shells in each zone such that the number of shells of a zone decreases as the distance from the view point increases.

FIG. 6 is a table showing an example of the zones determined by the shell count decision unit 331. As FIG. 6 shows, the zones are partitioned according to the distance from the view point, and the number of shells is decreased as the distance of the zone from the view point increases so as to implement LOD. The data shown in the table in FIG. 6 is stored in the RAM 12 by the shell count decision unit 331.

The way of partitioning the zones is determined by a predetermined algorithm. For example, the number of zones is initially determined regardless the position of the view point, and the projection plane is partitioned horizontally with equal intervals so as to satisfy the determined number of zones, or the number of zones is changed according to the distance between the green and the view point. When the number of zones is variable, the rule table, which corresponds to the distance from the green and the number of zones, may be stored in advance in the RAM 12, then the shell count decision unit 331 can partition zones according to that rule.

Figure 7:
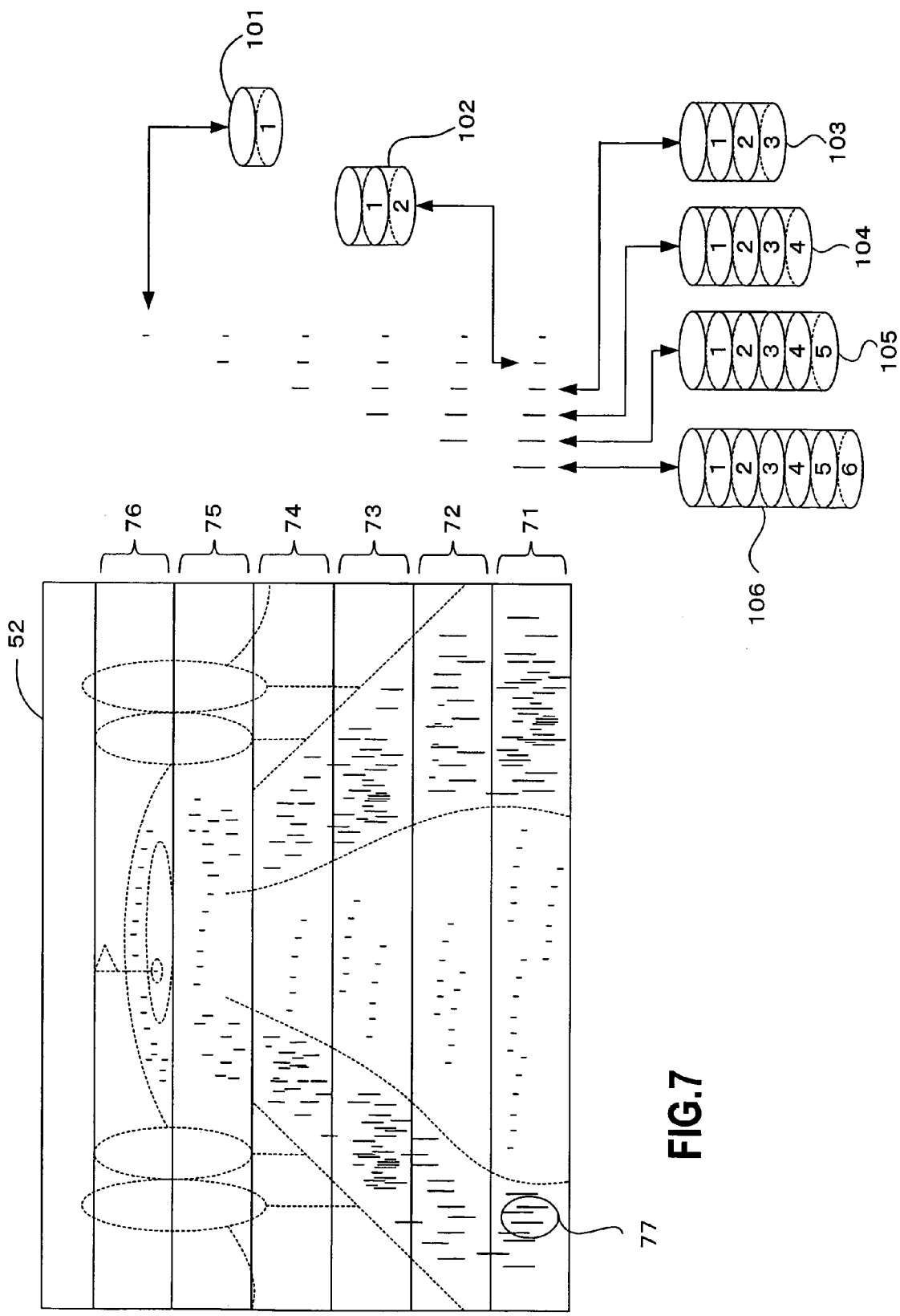
FIG. 7 is a diagram depicting an example of the zone division in the golf course of this example.

FIG. 7 is a diagram depicting an example of zone partition in the golf course of this embodiment. In FIG. 7, six zones, from the first zone called zone 71 to the sixth zone called 76, are shown in the sequence of closer to the view point. In the present embodiment, which focuses on the drawing of the turf, zones are not set in the area behind zone 76 where the golf course ends, and the turf is not drawn.

FIG. 7 also shows the type of turfs drawn in each zone. In other words, only the shortest turf 101 appears in zone 76, the most distant from the view point. In zone 75, which is the second most distant from the view point, turf 102, slightly higher than turf 101, appears in addition to turf 101. In the same way, a turf slightly higher than the previous turf is added as the zone becomes closer to the view point, and finally in zone 71, closest to the view point, six types of different turfs, turf 101 to turf 106, appear.

In FIG. 3, when the number of shells is determined, the shell count decision unit 331 notifies the completion of processing to the maximum brightness decision unit 332 to start the next processing. The maximum brightness decision unit 332 decides the amplitude (maximum brightness) of the periodic function, which is used for calculating the macro-brightness according to the distance from the view point. For example, the maximum brightness decision unit 332 provides a different value of maximum brightness for each zone determined by the shell count decision unit 331.

Figure 8:
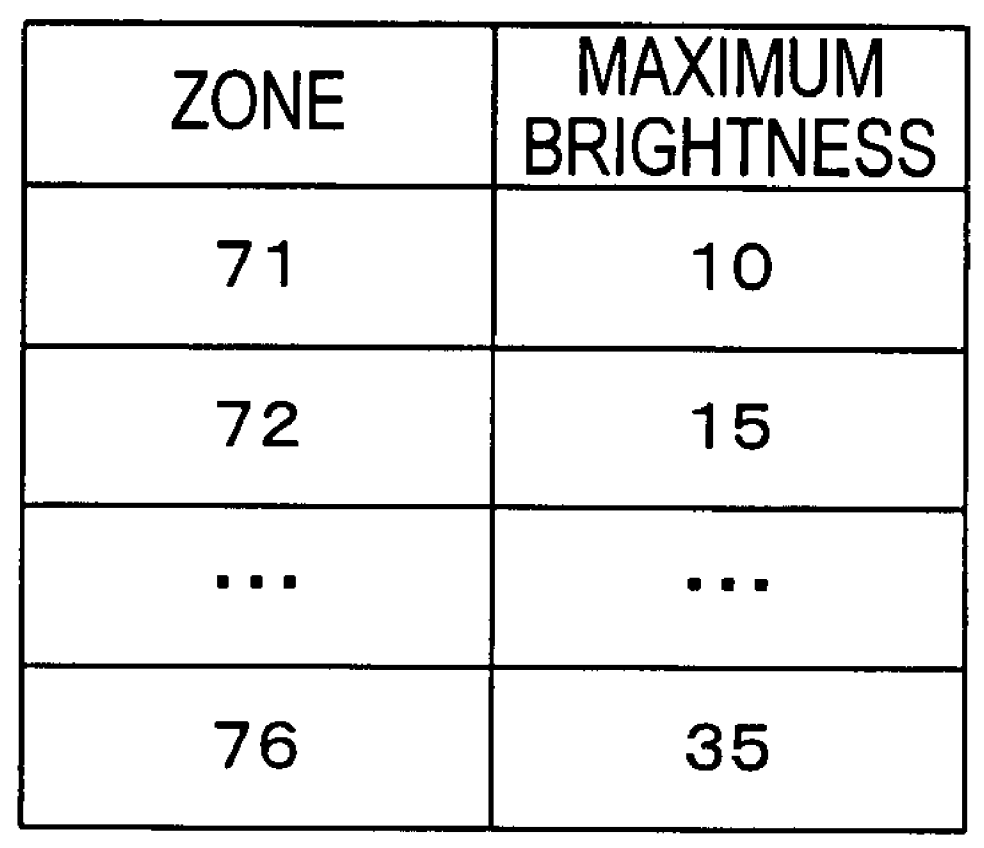

FIG. 8 is a table showing an example of the maximum brightness which the maximum brightness decision unit 332 provides to each zone. As FIG. 8 shows, the maximum brightness to be set increases as the distance from the view point increases. This is because representing the movement of turf by the fluctuation of shells becomes more difficult as the distance from the view point increases, so a macro-brightness is introduced to compensate for this. The data shown in the table in FIG. 8 is stored in the RAM 12.

In FIG. 8, a different maximum brightness is set for each zone, but the maximum brightness may be a value which is in proportion to the distance, simply by multiplying the distance by a predetermined coefficient. In this case, the predetermined coefficient has been stored in the RAM 12, and the brightness decision unit 332 provides the maximum brightness by multiplying the distance from the view point to the linear object by the predetermined coefficient read from the RAM 12.

In FIG. 3, when the maximum brightness is determined according to the distance from the view point, the maximum brightness decision unit 332 notifies the completion of processing to the lighting processing unit 333 to start the next processing. The lighting processing unit 333 calculates the micro-brightness and the macro-brightness. Particularly to calculate the macro-brightness, the lighting processing unit 333 considers the influence of wind.

[Micro-Brightness]

Figure 9:
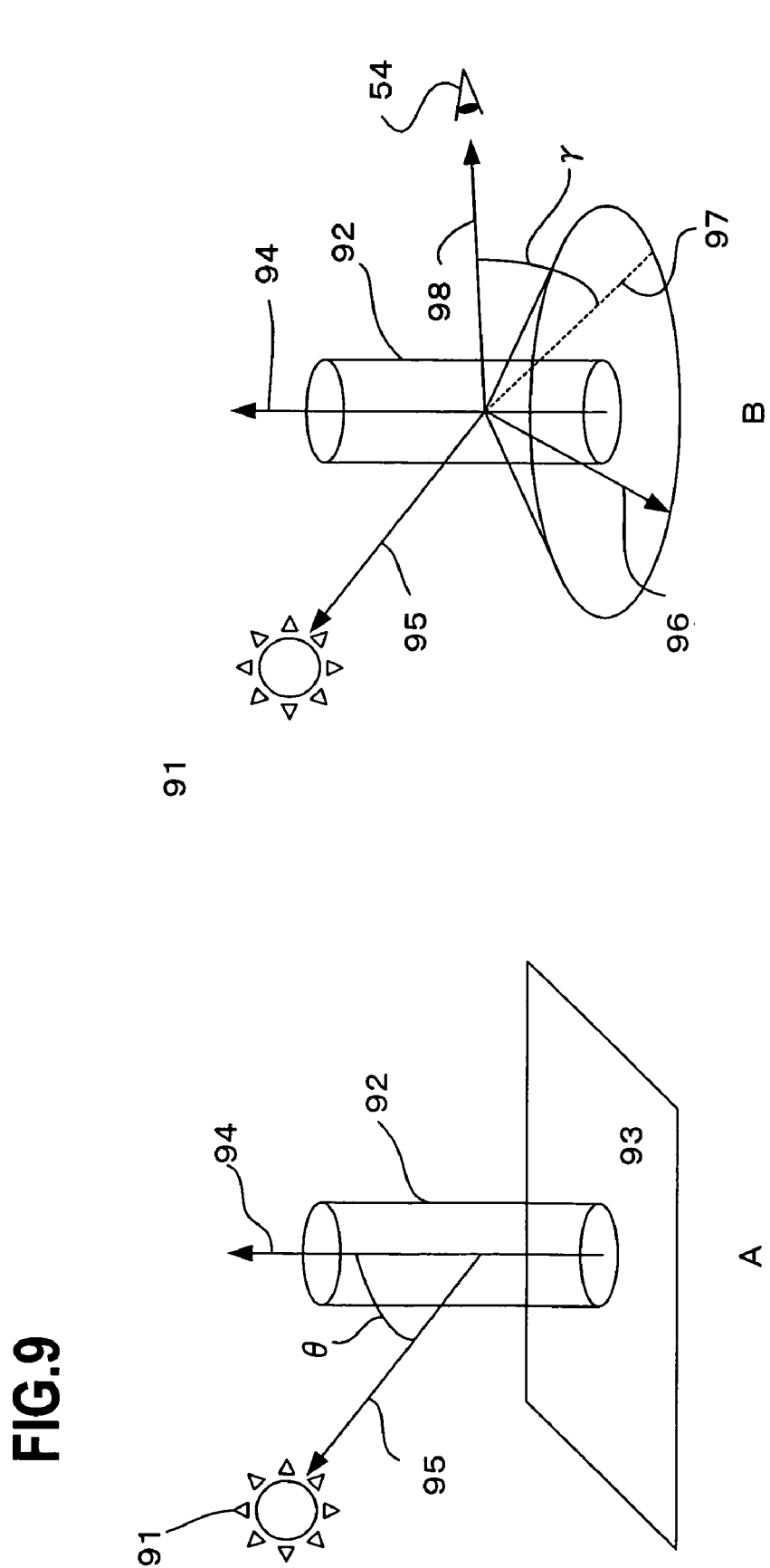
FIG. 9 is a diagram depicting an example of the micro-brightness calculation method.

FIG. 9 shows diagrams depicting an example of the calculation method for micro-brightness. FIG. 9 describes the method associated with "Rendering Fur with Three Dimensional Textures", SIGGRAPH '89, Conference Proceedings, where FIG. 9A is a diagram depicting the calculation method for the diffused light component Ad, and FIG. 9B is a diagram depicting the regular reflection light component As. These diagrams are cited from "Mounting by vertex shader of pseudo fur lighting". In this case, the micro-brightness MIC is calculated as the sum of the diffused light component Ad and the regular reflection light component As.

The linear object (turf in this case) 92 is shown as a cylindrical object, and one end thereof is fixed to the ground 93. In the diffused light component by the light source 91, the angle formed by the normal vector 94 of the ground 93 and the vector 95 in the ray direction is θ.

The detailed description is as shown in "Rendering Fur with Three Dimensional Textures", SIGGRAPH '89, Conference Proceedings, but the diffused light component Ad is calculated by the following Expression (A) using the symbols shown in FIG. 9A.

$$Ad = Kd \sin \theta \qquad \text{(A) Expression 1}$$

Here Kd is a diffuse reflectance. In the same way, using the symbols shown in FIG. 9B, the regular reflection light component As is calculated by the following Expression (B).

$$As = Ks(\cos \gamma)^n \qquad \text{(B) Expression 2}$$

Here Ks is a regular reflectance, and n is a highlight characteristic coefficient which indicates the spread of reflected light. As n is greater, the spread of the reflected light becomes narrower and light becomes sharper. γ is an angle formed by the edge line 97 formed by the light reflection vector 96 and the sight line vector 98. The lighting processing unit 333 calculates regarding the micro-brightness as MIC=Ad+As.

[Macro-Brightness]

Now an example of the calculation method for macro-brightness, which changes periodically by the periodic function, will be described. The lighting processing unit 333 calculates the macro-brightness MAC (t) at a predetermined time according to the following Expression (C).

$$MAC(t) = A \times \sin(2\pi f \times t + \alpha) \qquad \text{(C) Expression 3}$$

Here A=k*x, where k is a constant for determining the maximum change amount of the brightness, and x is a distance from the view point to the linear object. f is a frequency which is an inverse number of the period, and t is time. [α] is given by $$\alpha = \vec{K} \cdot \vec{P} \qquad \text{Expression 4}$$

that is, the inner product of the vector K and the vector P. The vector K indicates the direction of the wind, and the vector P indicates the position vector of the linear object. By determining the inner product of the vector K and the vector P, the time phase changes depending on the angle formed by the direction of the wind and the position vector of the linear object, and an effect, as if the light band lighting the turf is moving along with the direction of the wind, is realized.

Constant A in Expression (C) is simply a quantity which is in proportion to the distance, but A may be a coefficient assigned to each zone (see FIG. 8), as described in the description on the maximum brightness decision unit 332.

The lighting processing unit 333 selects one of the micro-brightness and the macro-brightness determined as above considering the degree of influence, or determines the weighted average of both, and finally calculates the brightness of the linear object. For example, comparing the micro-brightness and the macro-brightness, it is judged that the greater value has a greater degree of influence, and the brightness with the greater value is used.

FIG. 10 is a rule table showing an example of micro-brightness and macro-brightness which are indicated as rates. As this rule table shows, the degree of influence of micro-brightness decreases as the distance from the view point increases, and that of the macro-brightness increases as the distance from the view point increases. This table is stored in the RAM 12 when the shell count decision unit 331 determines zones. The mixing rates (degree of influence of the respective brightness) of the micro-brightness and the macro-brightness can be set freely, and the position, where the effect of the periodic brightness change, is enhanced can be changed freely.

Figure 11:
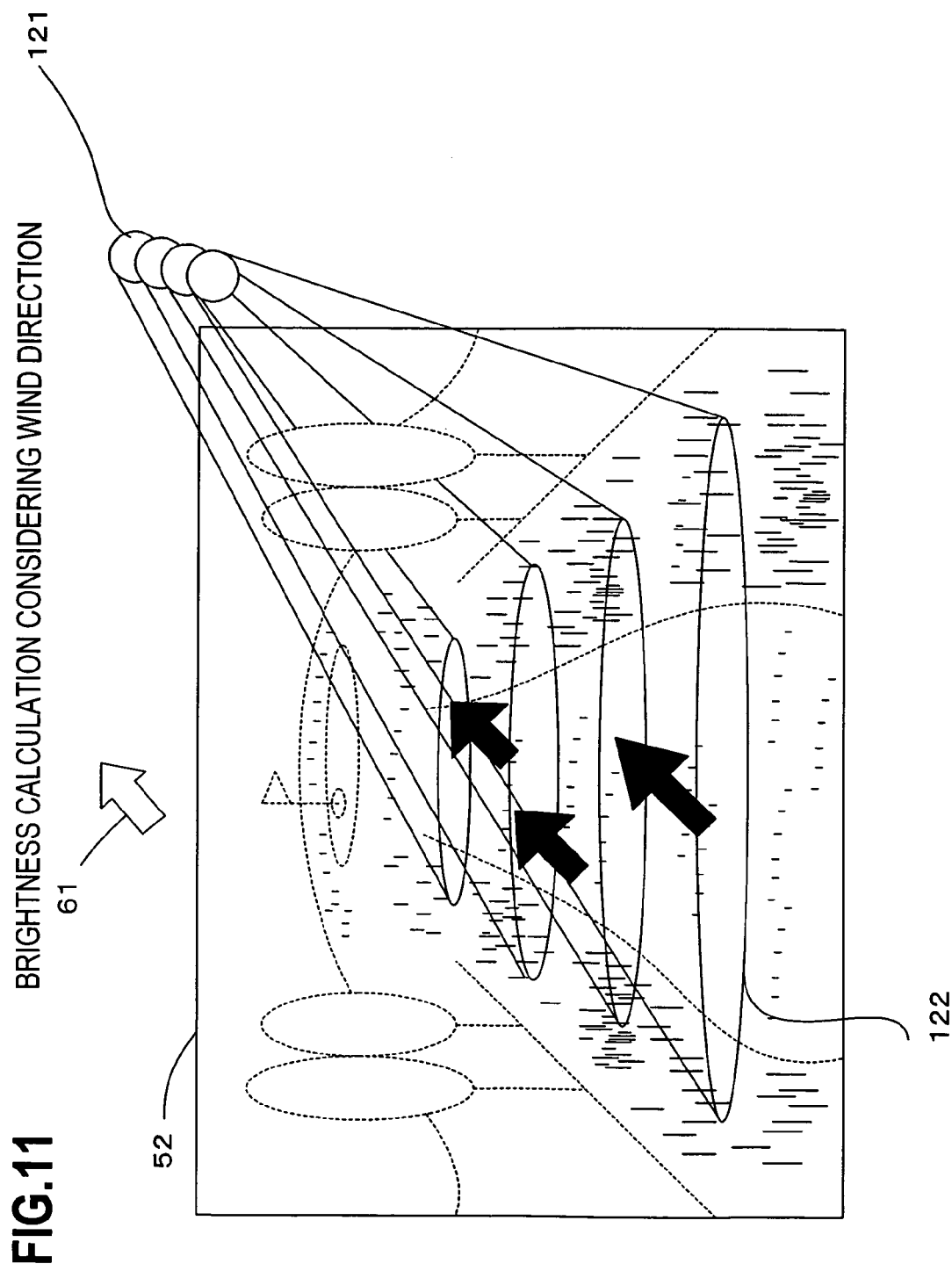
FIG. 11 is a diagram depicting the effect of macro-brightness considering the direction of the wind.

FIG. 11 is a diagram depicting the effect of macro-brightness taking the direction of the wind into consideration. FIG. 11 is for merely describing the influence of the macro-brightness, and the influence of the macro-brightness is set to 100% here regardless the distance from the view point. By changing the brightness at each location periodically using Expression (C), the light spot 122 (which can also be spread like a band) as shown in FIG. 11 can be periodically moved many times, from the front to the back according to the direction of the wind, which can represent the wind blowing through the turf quite well. In other words, brightness, when the moving light source 121 is moving along the direction of the wind, is calculated here. This however does not mean that a moving light source is actually provided in the three-dimensional virtual space.

[Fluctuation of Shell]

In FIG. 3, when the lighting processing unit 333 completes the above mentioned brightness calculation taking the direction of the wind into consideration, the texture coordinate calculation unit 334 performs calculation to acquire a visual effect as if tall turf is fluctuating.

Figure 12:
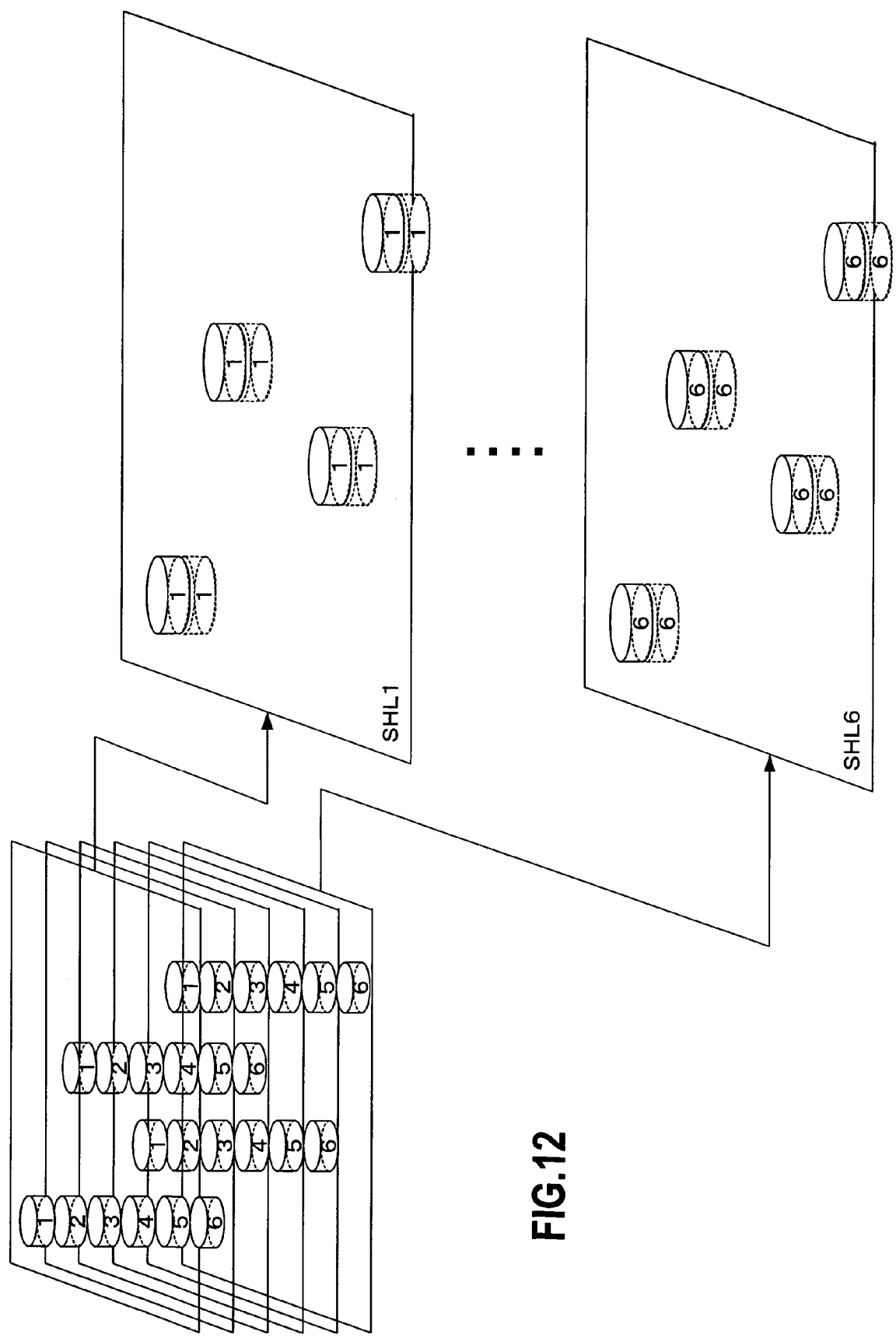
FIG. 12 is a diagram depicting the status of a shell.

FIG. 12 is a diagram depicting the status of shells, and is the area 77 in zone 71 extracted from FIG. 7. In area 77, the four tallest grasses of turf in FIG. 7 are drawn, which corresponds to the four cylindrical stack type blocks at the upper left in FIG. 12. A shell is a plane for cutting so that the cross-section of the six levels of blocks appear in each layer, and is a plane which is parallel with the ground where one end of the turf is fixed.

Figure 13:
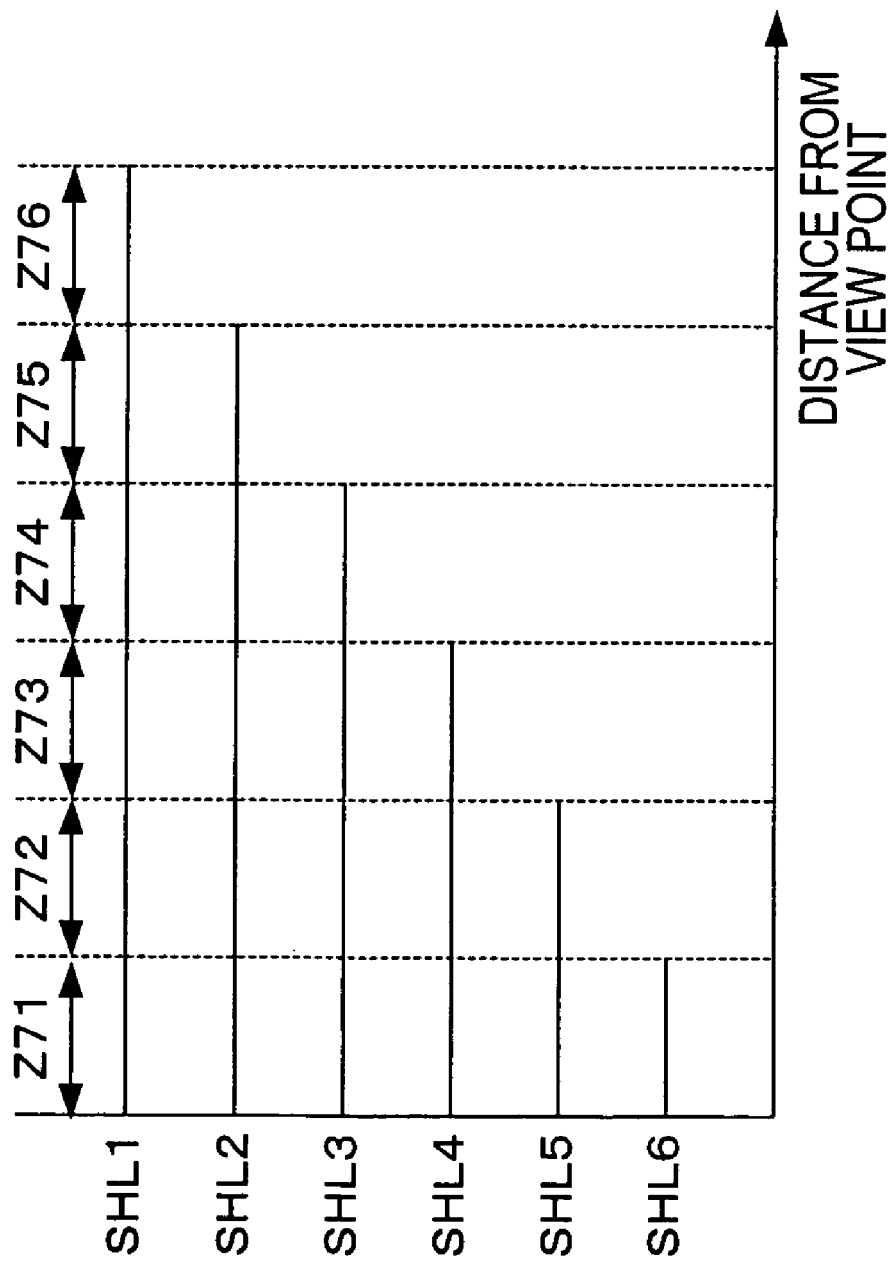
FIG. 13 shows the relationship between the distance from the view point and the number of shells.

FIG. 13 shows the relationship between the distance from the view point and the number of shells. In zone 71 (Z71) close to the view point, turf is drawn with six layers from shell 1 (SHL1) to shell 6, and in the next zone 72 (Z72), five layers from shell 1 to shell 5 are drawn, and four shells are drawn in the next zone, zone 73, and in this way the number of shells gradually decreases, and in zone 76, which is most distant from the view point, turf is drawn only with one layer, shell 1. LOD is implemented in this way.

Figure 14:
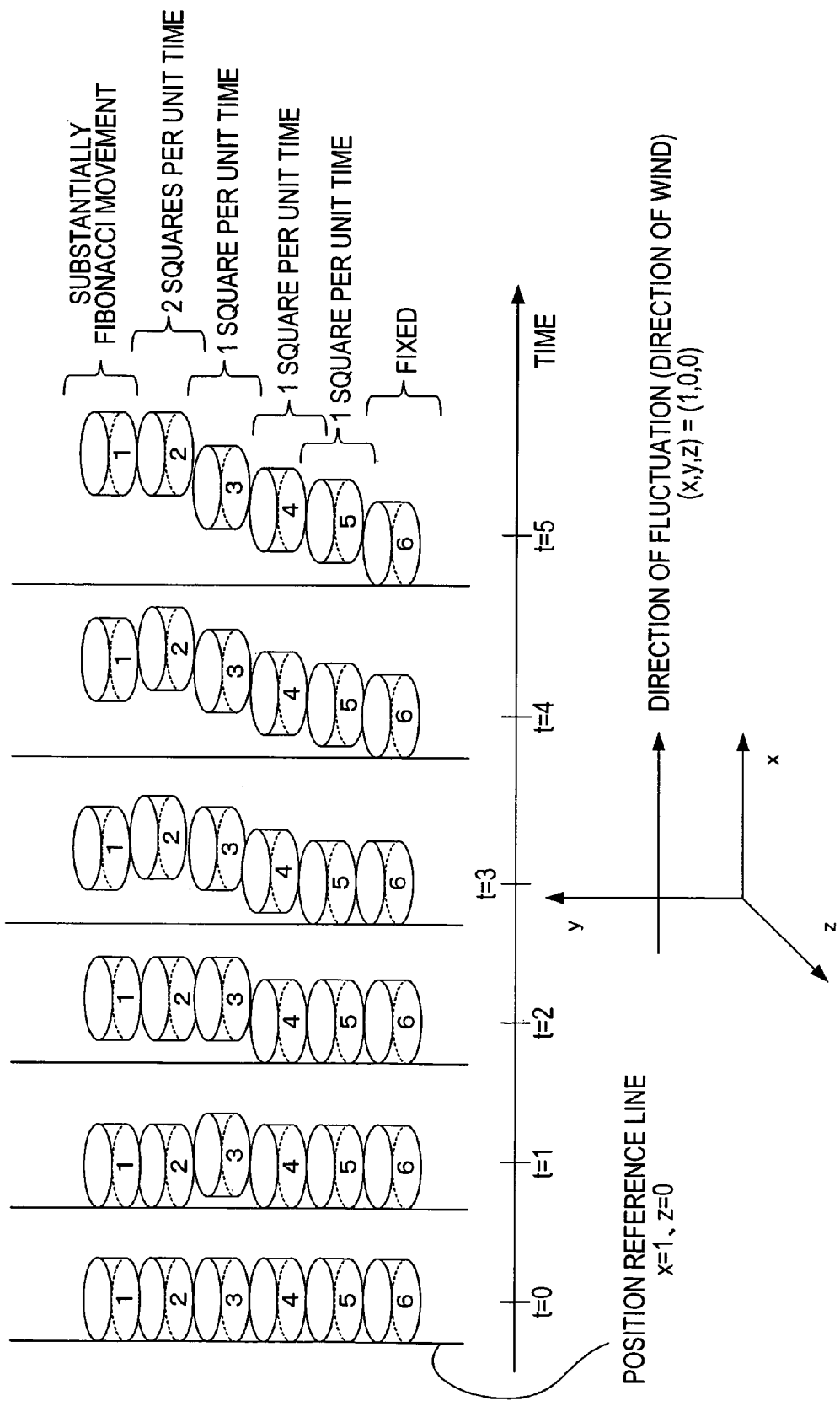
FIG. 14 is a diagram depicting an example of the fluctuation of linear objects caused by the fluctuation of shells.

FIG. 14 is a diagram depicting an example of the fluctuation of the linear objects caused by the fluctuation of the shells. Here it is assumed that the direction of the wind is from the left to right to simplify description. In other words, in the coordinate system introduced in FIG. 14, shells are fluctuated in the direction of (x, y, z)=(1, 0, 0). It is assumed that the linear object is positioned so as to extend from the origin in the y axis direction.

The manner of fluctuation of each layer (each shell) can be set freely. Here it is assumed that shell 1-shell 6 are fluctuated according to the following rule. In other words, shell 1: movement according to a Fibonacci sequence, shell 2: movement amount per unit time is 2, shell 3: movement amount per unit time is 1, shell 4: movement amount per unit time is 1, the movement however starts 2 unit times later, and shell 5: movement amount per unit time is 1, the movement however starts 3 unit times layer.

The position of each shell in the x axis indicated as a time function is as follows: shell 1: $x(t+2)=x(t+1)+x(t)$, $t \geq 2$, $x(0)=0$, $x(1)=0$, $x(2)=2$, $x(3)=3$; shell 2: $x(t)=2t$; shell 3: $x(t)=t$; shell 4: $x(t)=t-2$; shell 5: $x(t)=t-3$; and shell 6: $x(t)=0$.

In this way, the status of the turf fluctuating by the wind, as shown in FIG. 14, can be drawn. When the time, from the start point (x=0) to each shell moved the maximum amount, which is set for each shell, has elapsed, the direction of fluctuation is reversed, and by repeating this reciprocating motion, the scene of wind blowing intermittently can be drawn. For the motion in the reverse direction, the way of fluctuating the shell (x (t) for defining the movement of each shell) may be changed from that of the shell in the forward direction (direction in (x, y, z)=(1, 0, 0)).

If the speed of reciprocating motion is changed, it can be expressed whether a breeze of the wind is blowing or a strong wind is blowing. If a reverse motion is switched to forward movement before returning to the status of t=0, which is when an object stands straight up at the origin in FIG. 14, then the interval of wind that blows intermittently can be changed in a drawing.

The manner of fluctuation can be changed for each layer (shell) in this way, but the upper limit of the moving amount may be changed for each layer. In FIG. 14, the area close to the ground (shell 6) is not moved, and the area close to the tip (shell 1) has a large moving amount. A more natural movement can be drawn by the area close to the ground not being moved and the area close to the tip being more freely moved.

FIG. 15 is a table showing an example of the maximum moving amount to be set for each shell. In FIG. 15, the maximum moving amount corresponds to shell 1 (SHL1) which is close to the tip and shell 6 (SHL6) and which is close to the ground. Shell 6 of which the moving amount is "0" indicates that the shell is not fluctuated. It is certainly possible to set such that all shells are fluctuated. The data shown in the table in FIG. 15 is stored in the RAM 12 by the shell count decision unit 331 when the number of shells is determined, and is read and used by the texture coordinate calculation unit 335.

The maximum moving amount can be changed according to the distance from the view point. This is because the number of shells is decreased in an area distant from the view point to implement LOD, where it is possible that a visual effect may not be exhibited very much even if the shells are fluctuated, or there may be no shells to be fluctuated.

Figure 16:
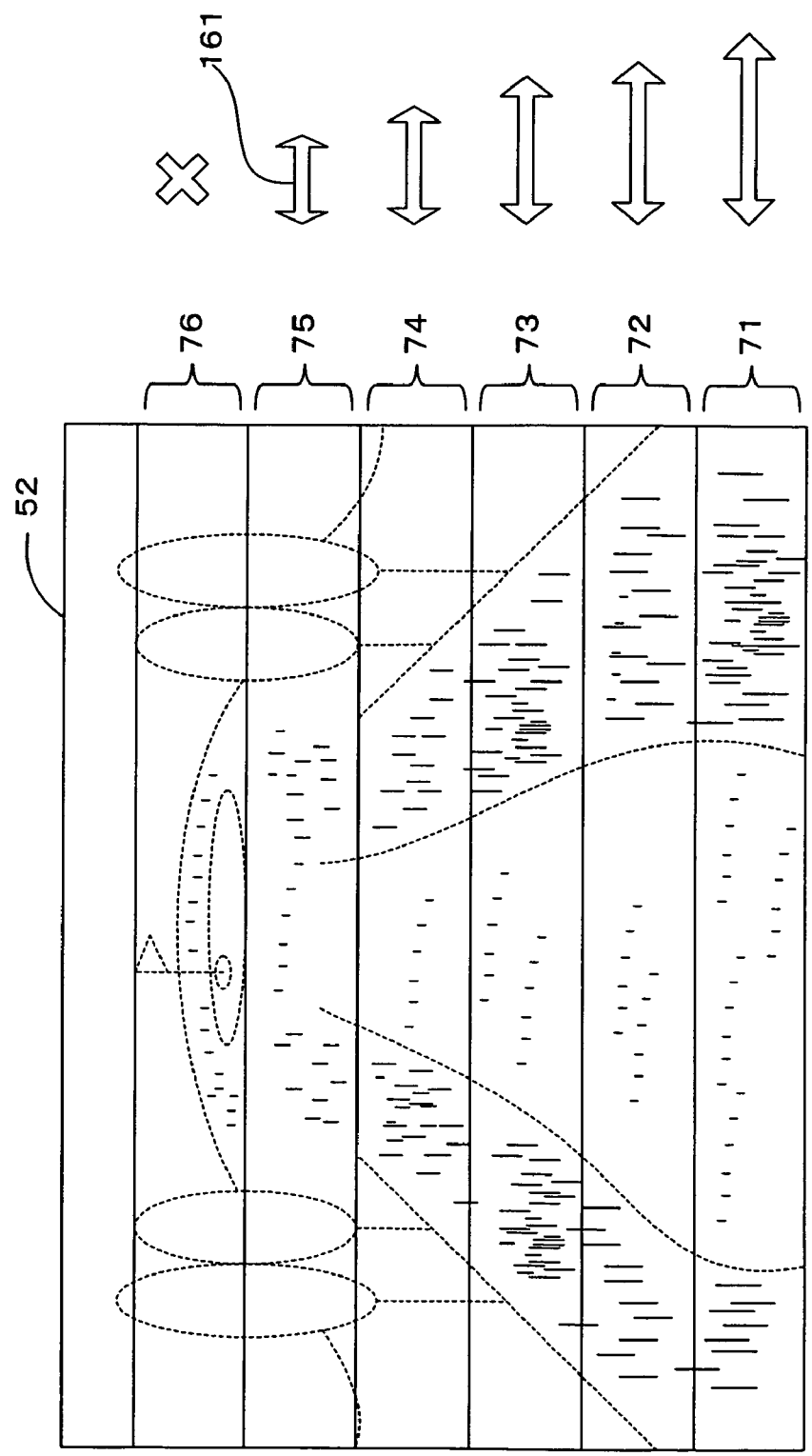
FIG. 16 is a diagram depicting the distribution of the maximum moving amount according to the distance from the view point.

FIG. 16 is a diagram depicting the distribution of the maximum moving amount according to the distance from the view point. As FIG. 16 shows, the shells do not move in zone 76, which is the most distant from the view point. In other words, the maximum moving amount is zero. In the adjacent zone 75, a predetermined moving amount shown by the width of the arrow 161 is set. The width of the arrow increases and the maximum moving amount to be set increases gradually as the zone becomes closer to the view point. The data on the maximum moving amount for each zone shown in FIG. 16 is stored in the RAM 12 by the shell count decision unit 331 when the number of shells is determined, and is stored in the "Fluctuation" item corresponding to each zone in FIG. 10 as the rate of the degree of influence.

The texture coordinate calculation unit 334 moves each shell in order to perform the processing described in FIG. 12 to FIG. 16, and an example of the calculation is shown in the following Expressions ((D) and (E)). These are expressions to calculate the offset value to be added to the current uv coordinates in the view reference coordinate system. If the offset in the u axis direction is u0, and the offset in the v axis direction is v0, then $$v0 = M\_u \times Ap \times \cos(2\pi f \times t) \quad \text{(D)}$$

$$v0 = M\_v \times Ap \times \cos(2\pi f \times t) \quad \text{(E) Expression 5}$$

Here vector M=(M_u, M_v) is the uv component in the direction of fluctuating the shells, f is the number of times of fluctuating the shell per second, and t is the time. Ap is a constant for adjustment, in which the distance from the ground (e.g. the layer number of a shell) and the distance from the view point are reflected, and is given by the following Expression (F).

$$Ap = C \times Sh \times Sh \times Zn \quad \text{(F) Expression 6}$$

Sh is a height from the ground to the shell, and according to Expression (F), the fluctuation increases as the shell becomes more distant from the ground. For the portion of Sh x Sh in Expression (F), the maximum moving amount which is set for each shell in FIG. 15 may be used. Zn is a rate of the degree of influence with respect to the maximum moving amount which is set for each zone (see the "Fluctuation" item in FIG. 10).

In this way when a shell is fluctuated, the moving amount thereof is calculated taking the height of the shell and the position of the zone into consideration. When the reciprocating motion time for reciprocating motion elapses, the offset changes from positive to negative, and from negative to positive by the periodicity of the trigonometric function, so the turf can be reciprocated and the status of the turf being fluctuated by wind can be reproduced naturally.

In FIG. 3, when the above mentioned offset calculation on the coordinates of the shells completes in the texture coordinate calculation unit 334, the perspective transformation unit 335 actually transforms the world coordinate system into the view reference coordinate system. Here the offset value calculated by the texture coordinate calculation unit 334 is added to the coordinates of the linear objects included in each shell, and the coordinate data is input into the rendering unit 34 for rendering.

Figure 17:
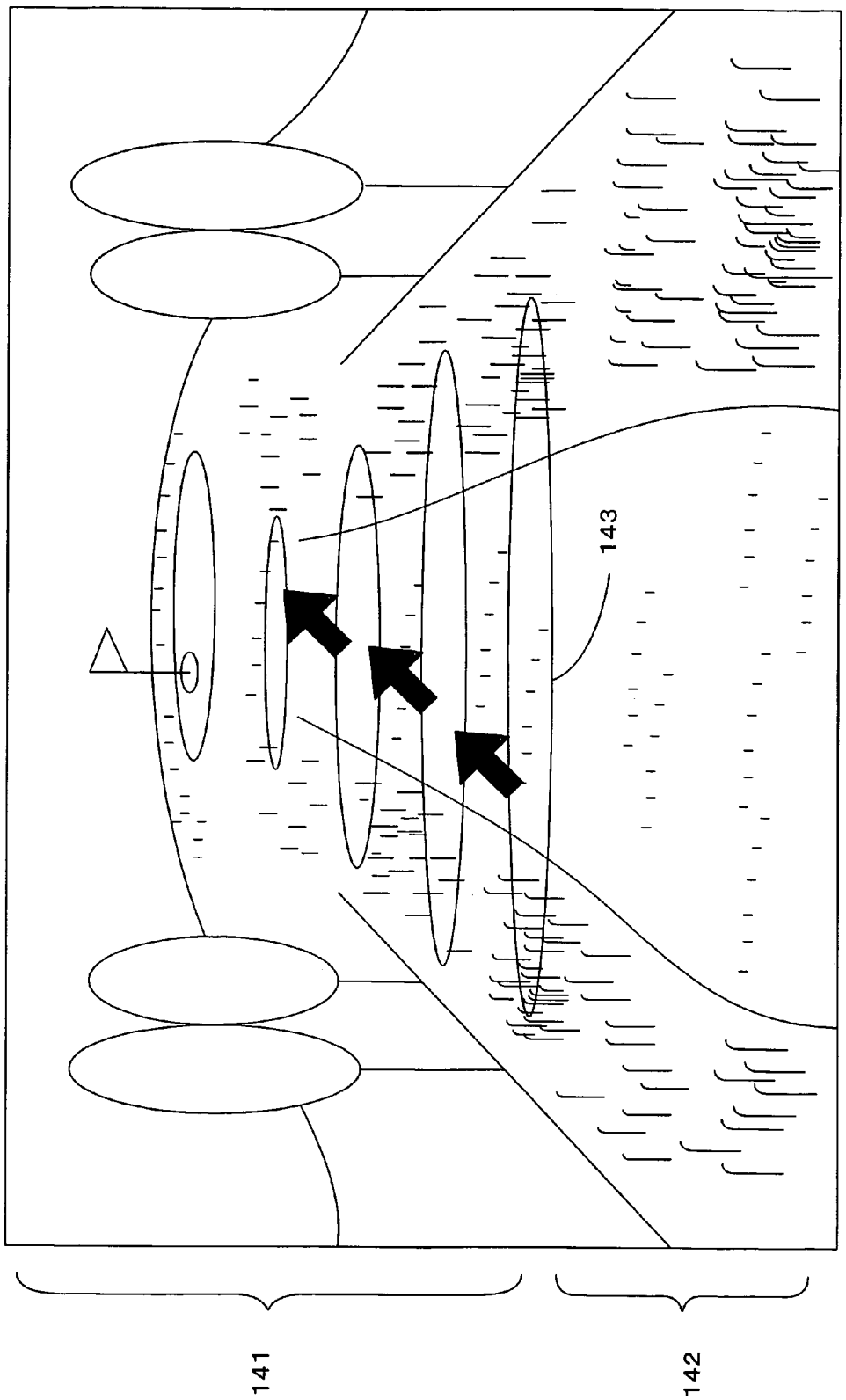
FIG. 17 is a screen example depicting the effect when lighting, considering the direction of wind, and the fluctuation of shells, are mixed according to the degree of influence.

FIG. 17 is a screen example depicting the effect when the lighting, considering the direction of the wind, and the fluctuation of the shells, which were described above, are mixed according to the degree of influence shown in FIG. 10. In the screen example shown in FIG. 17, the screen can be partitioned into the area 142 where the fluctuation of the shells is more strongly represented, and into the area 141 where the influence of lighting which changes periodically is more strongly represented.

In the area 142, the tips of the turf swing along the direction of the wind 61, as shown in FIG. 17, and this fluctuating status changes as time elapses according to Expressions (D) and (E). In the area 141, the effect of the fluctuation of the shells is not exhibited very much, but instead the light spot 143 moves from the front to the back as time elapses, by which the status of the wind blowing through the surface of the turf is drawn. This is the effect exhibited by the periodic change of brightness according to Expression (C).

Finally image processing by the image processor 1 of the present embodiment will be described.

Figure 18:
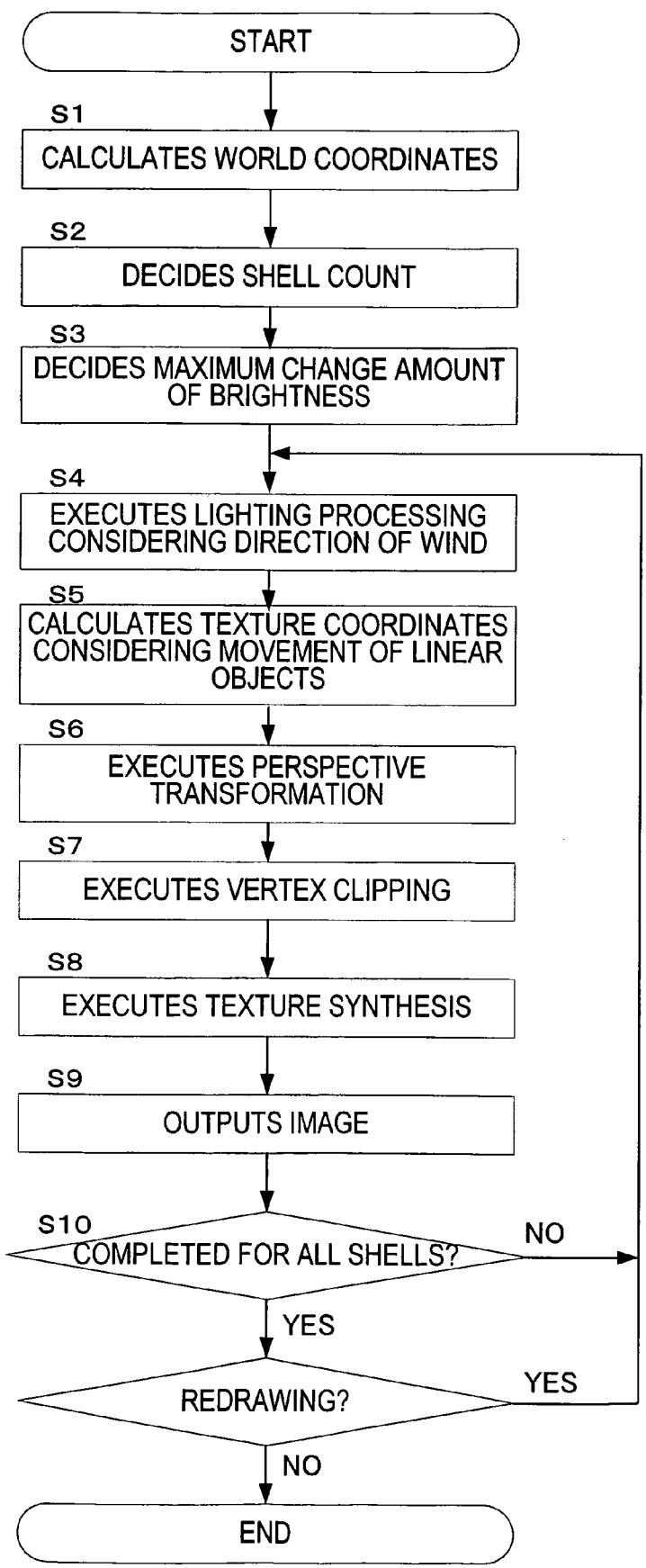
FIG. 18 is a flow chart depicting the processing of drawing a turf by the image processor of the present embodiment.

FIG. 18 is a flow chart depicting the drawing processing for the turf by the image processor 1 of the present embodiment. First the geometry computing unit 31 calculates the world coordinates (S1). By this, the vertex coordinates of the polygon constituting the object to be a drawing target are determined. Then the shell count decision unit 332 determines the number of shells (S2).

The shell count decision unit 332 partitions the range, in which the linear objects appear, into zones according to a predetermined algorithm. At this time various settings related to the tables in FIG. 6 and FIG. 10 are performed and stored in the RAM 12.

And the maximum brightness decision unit 333 determines the maximum change amount of the brightness (S3). For example, as FIG. 8 shows, the numeric value is determined for each zone. The value may be set so as to be in proportion to the distance from the view point. Then lighting processing, taking the direction of wind into consideration, is executed for each shell (S4).

As described in the section of the lighting processing unit 333, the micro-brightness and the macro-brightness are calculated, and one of these is selected considering the degree of the influence shown in FIG. 10, or the final brightness is calculated by mixing both according to the degree of the influence.

Then the texture coordinate calculation unit 334 calculates the texture coordinates considering the movement of the linear object (e.g. turf) (S5). Specifically, the texture coordinate calculation unit 334 calculates the offset value of the moving amount for each shell. When this calculation is performed, flexible movement is created by increasing the moving amount as the object becomes distant from the ground, or by decreasing the moving amount as the distance from the view point increases.

And the perspective transformation unit 335 transforms the world coordinate system into the view reference coordinate system (S6). The rendering unit 34 performs such processing as clipping using the front clipping plane and the back clipping plane and the hidden surface removal and the hidden line removal (S7), synthesizes the data acquired by the above processing (S8), and writes the data to each address of the frame buffer 37 corresponding to the display position of the display unit, such as a CRT.

And the data written in the frame buffer 37 is repeatedly read, converted into video signals, and is output to the display unit 17 (S9). After step S9 completes, it is judged whether the processing completed for all the shells, and if shells to be drawn remain (NO in S10), processing returns to step S4.

If drawing is completed for all the shells (YES in S10), it is judged whether redrawing is performed after a predetermined time elapsed (S11). Redrawing is performed according to the display timing of the display unit, so the predetermined time is $\frac{1}{60}$ seconds or $\frac{1}{30}$ seconds, for example. In step S11, processing normally progresses with positive judgment (YES in S11) regarding redrawing as necessary until the screen is switched (e.g. next golf shot is taken by the operation of the player, and the golf ball moves). In the case of the above example, redrawing is performed by substituting a new time after a predetermined time elapsed for time t in Expressions (C), (D) and (E) and performing the computing. For the data which does not depend on time, a value determined in previous processing is used as is (e.g. micro-brightness). If redrawing is unnecessary (NO in S11) since the screen is switched, this processing ends, and the image processor stands by for the drawing of the next course.

As described above, according to the present embodiment, when the turf, positioned in three-dimensional virtual space, is represented, semi-transparent layers (shells) with different heights are layered to draw the turf at high-speed, and the movement of turf, such as turf bending by wind or fluctuating, can be represented by fluctuating the shells according to the elapse of time. By this, the movement of turf can be represented with a low calculation volume.

Also when the number of shells to draw the turf is decreased according to the distance from the view point positioned in three-dimensional space in order to implement LOD (Level Of Detail), the number of shells to be fluctuated to represent the movement of the turf may not exist in an area distant from the view point, or the number of shells may be so few that a visual effect thereof is weak, but by the image processor 1 of the present embodiment, these problems are solved. For this, when lighting processing is performed, the image processor 1 of the present embodiment uses a value determined by a periodic function of which a variable is time, in addition to the brightness (micro-brightness) from the light source fixed in three-dimensional virtual space, so that the turf in an area distant from the view point becomes lighter or darker in a predetermined period. By this periodic change of brightness, the movement of linear objects can be represented even in an area where the number of shells is few.

By using the periodic elements, of which a variable is time, for brightness, a predetermined brightness can be provided to a wider range than the area influenced by a fixed light source. Therefore the movement of turf fluctuating by wind can be collectively represented. Here the brightness for representing this collective movement is called "macro-brightness". By using macro-brightness in addition to micro-brightness, the movement of turf fluctuating along the direction of wind can be represented without dynamically fluctuating the turf.

What is claimed is:

1. A recording medium storing a computer program for executing image processing for projecting and drawing a plurality of linear objects viewed from a view point on a two-dimensional plane when the view point, a ground, and the plurality of linear objects, of which one end of each linear object is fixed on the ground, are positioned in a virtual three-dimensional space, the computer program comprising the steps of:

a drawing step of layering the cross-sections of the plurality of linear objects created by cutting the plurality of linear objects at a plurality of planes which are parallel with the ground and heights are different for each of the plurality of planes as semi-transparent layers and drawing the cross-sections on the two-dimensional plane; and a redrawing step of moving a part or all of the semi-transparent layers in a predetermined direction after a predetermined time elapsed and redrawing the semi-transparent layer(s) on the two-dimensional plane, wherein an image including the plurality of linear objects is divided into a plurality of zones and the number of the semi-transparent layers for every zone is decided by the drawing step, the predetermined direction is a direction of three-dimensions defined in the virtual three-dimensional space; and the zone is partitioned to a direction of depth in the virtual three-dimensional space.

2. The recording medium according to claim 1, wherein the program further comprises the steps of:

calculating, for each the linear object, a first brightness based on a static light source fixed in the three-dimensional virtual space and a second brightness which is different from the first brightness and which changes over time, determining the degree of influence of the first brightness and the second brightness, and obtaining the brightness of the plurality of linear objects respectively based on the first brightness and the second brightness and the degree of influence which is determined for the first brightness and the second brightness respectively.

3. The recording medium according to claim 1, wherein the moving amount is less as the semi-transparent layer becomes closer to the ground.

4. The recording medium according to claim 1, wherein the redrawing step is executed repeatedly, and the semi-transparent layer, which is moved in the redrawing step, is moved for a predetermined moving amount in the opposite direction of the predetermined direction after being moved for the predetermined amount in the predetermined direction so as to implement reciprocation of movement.

5. The recording medium according to claim 1, wherein in the drawing step the number of semi-transparent layers to be drawn is decreased as the distance from the view point increases, and in the redrawing step, the semi-transparent layers are not moved in an area which exceeds the distance where the number of the semi-transparent layers is lower than a first threshold in the three-dimensional space.

6. The recording medium according to claim 2, wherein in the drawing step, the number of semi-transparent layers to be drawn is decreased as the distance from the view point increases, and the degree of the influence of the second brightness is greater than the degree of the influence of the first brightness in an area which exceeds the distance where the number of the semi-transparent layers is lower than a second threshold in the three-dimensional virtual space.

7. The recording medium according to claim 1, wherein the position of the semi-transparent layer to be moved is determined by a first periodic function of which a variable is time.

8. The program according to claim 7, wherein the second brightness of the linear object is determined by a second periodic function of which a variable is time and which has a period the same as the first periodic function.

9. An image processor for projecting and drawing a plurality of linear objects viewed from a view point on a two-dimensional plane when the view point, a ground, and the plurality of linear objects, of which one end of each linear object is fixed on the ground, are positioned in a virtual three-dimensional space, comprising:

a storage unit for storing a control program and data on the view point, the ground and the linear objects respectively; and a control unit for implementing a drawing function for layering the cross-sections of the plurality of linear objects created by cutting the plurality of linear objects at a plurality of planes which are parallel with the ground for each of the plurality of planes as semi-transparent layers, and drawing the cross-sections on the two-dimensional plane, and a redrawing function for moving a part or all of the semi-transparent layers in a predetermined direction after a predetermined time elapsed and redrawing the semi-transparent layer(s) on the two-dimensional plane, by reading the control program and the respective data from the storage unit, wherein the control unit divides an image including the plurality of linear objects into a plurality of zones and decides the number of the semi-transparent layers for every zone, the predetermined direction is a direction of three-dimensions defined in the virtual three-dimensional space; and the zone is partitioned to a direction of depth in the virtual three-dimensional space.

10. The image processor according to claim 9, wherein the control unit implements a function of calculating, for each the linear object, a first brightness based on a static light source fixed on the three-dimensional virtual space and a second brightness which is different from the first brightness and changes over time, determining the degree of the influence of the first brightness and the second brightness, and obtaining the brightness of the plurality of linear objects respectively based on the first brightness and the second brightness and the degree of the influence which is determined for the first brightness and the second brightness respectively.

11. The image processor according to claim 9, wherein the moving amount is less as the semi-transparent layer becomes closer to the ground.

12. The image processor according to claim 9, wherein the redrawing is executed repeatedly, and the semi-transparent layer, which is moved during the redrawing, is moved for a predetermined moving amount in the opposite direction of the predetermined direction after being moved for the predetermined amount in the predetermined direction, so as to implement reciprocation of movement.

13. The image processor according to claim 9, wherein when the drawing function is executed, the control unit decreases the number of semi-transparent layers to be drawn as the distance from the view point increases, and when the redrawing function is executed, the control unit prevents the semi-transparent layers from being moved in an area which exceeds the distance where the number of the semi-transparent layers is lower than a first threshold in the three-dimensional space.

14. The image processor according to claim 10, wherein when the drawing function is executed, the control unit decreases the number of semi-transparent layers to be drawn as the distance from the view point increases, and the degree of the influence of the second brightness is greater than the degree of the influence of the first brightness in an area which exceeds the distance where the number of the semi-transparent layers is lower than a second threshold in the three-dimensional virtual space.

15. The image processor according to claim 9, wherein the position of the semi-transparent layer to be moved is determined by a first periodic function of which a variable is time.

16. The image processor according to claim 15, wherein the second brightness of the linear object is determined by a second periodic function of which a variable is time and which has a period the same as the first periodic function.

17. An image processing method executed by an image processor for projecting and drawing a plurality of linear objects viewed from a view point on a two-dimensional plane when the view point, a ground, and the plurality of linear objects, of which one end of each linear object is fixed on the ground, are positioned in a virtual three-dimensional space, comprising:
- a drawing step of layering the cross-sections of the plurality of linear objects created by cutting the plurality of linear objects at a plurality of planes which are parallel with the ground for each of the plurality of planes as semi-transparent layers, and drawing the cross-sections on the two-dimensional plane; and
- a redrawing step of moving a part or all of the semi-transparent layers in a predetermined direction after a predetermined time elapsed and redrawing the semi-transparent layer(s) on the two-dimensional plane, wherein an image including the plurality of linear objects is divided into a plurality of zones and the number of the semi-transparent layers for every zone is decided by the drawing step, the predetermined direction is a direction of three-dimensions defined in the virtual three-dimensional space; and the zone is partitioned to a direction of depth in the virtual three-dimensional space.

* * * * *